United States Patent
Phillips

(10) Patent No.: US 8,489,989 B1
(45) Date of Patent: Jul. 16, 2013

(54) METHODS AND SYSTEMS FOR PREFLIGHTING USING MULTIPLE PREFLIGHT PROFILES

(75) Inventor: Matthew J. Phillips, Champaign, IL (US)

(73) Assignee: Adobe Systems Incorporated, San Jose, CA (US)

( * ) Notice: Subject to any disclaimer, the term of this patent is extended or adjusted under 35 U.S.C. 154(b) by 1035 days.

(21) Appl. No.: 12/173,761

(22) Filed: Jul. 15, 2008

(51) Int. Cl.
*G06F 17/27* (2006.01)

(52) U.S. Cl.
USPC ......................................................... 715/277

(58) Field of Classification Search
USPC ......................................................... 715/277
See application file for complete search history.

(56) References Cited

U.S. PATENT DOCUMENTS

| | | | | |
|---|---|---|---|---|
| 5,899,975 | A * | 5/1999 | Nielsen ....................... 704/270.1 |
| 6,023,714 | A * | 2/2000 | Hill et al. ........................ 715/235 |
| 6,289,382 | B1 * | 9/2001 | Bowman-Amuah .......... 709/226 |
| 6,608,697 | B1 | 8/2003 | Schorr et al. |
| 6,684,336 | B1 * | 1/2004 | Banks et al. ................... 709/227 |
| 7,003,652 | B2 * | 2/2006 | Nevill et al. ................... 712/244 |
| 7,134,073 | B1 * | 11/2006 | Fiedorowicz et al. ........ 715/235 |
| 7,171,459 | B2 * | 1/2007 | Sanghvi et al. ............... 709/223 |
| 7,350,190 | B2 * | 3/2008 | Torres et al. .................. 717/105 |
| 7,490,290 | B2 * | 2/2009 | White et al. .................. 715/236 |
| 7,747,941 | B2 * | 6/2010 | Campbell et al. ............. 715/234 |
| 7,847,968 | B2 * | 12/2010 | Abiko ........................... 358/1.17 |
| 8,225,196 | B2 * | 7/2012 | Ramakrishna et al. ....... 715/234 |
| 2002/0116399 | A1 * | 8/2002 | Camps et al. ................. 707/200 |
| 2003/0149766 | A1 * | 8/2003 | Syvanne et al. .............. 709/224 |
| 2004/0111430 | A1 * | 6/2004 | Hertling et al. ............ 707/104.1 |
| 2004/0123244 | A1 * | 6/2004 | Campbell et al. ............. 715/517 |
| 2004/0172393 | A1 * | 9/2004 | Kazi et al. ........................ 707/6 |
| 2004/0208500 | A1 * | 10/2004 | Kiyosu et al. ................. 396/549 |
| 2005/0021548 | A1 * | 1/2005 | Bohannon et al. ............ 707/101 |
| 2005/0028093 | A1 * | 2/2005 | Michel et al. ................. 715/526 |
| 2005/0097448 | A1 * | 5/2005 | Giannetti et al. ............. 715/508 |
| 2005/0267795 | A1 * | 12/2005 | Tian et al. ........................ 705/10 |
| 2006/0043668 | A1 * | 3/2006 | Walker et al. ............... 273/138.1 |
| 2006/0080616 | A1 * | 4/2006 | Vogel et al. ................... 715/769 |
| 2006/0218490 | A1 * | 9/2006 | Fink .............................. 715/517 |
| 2007/0240041 | A1 * | 10/2007 | Pearson ........................ 715/522 |
| 2008/0064501 | A1 * | 3/2008 | Patel .............................. 463/40 |
| 2008/0109128 | A1 * | 5/2008 | Littooy et al. .................. 701/29 |
| 2008/0275838 | A1 * | 11/2008 | Randazzo et al. .............. 706/59 |
| 2009/0031216 | A1 * | 1/2009 | Dressel et al. ................ 715/255 |
| 2009/0182567 | A1 * | 7/2009 | Stine et al. ........................ 705/1 |
| 2009/0193035 | A1 * | 7/2009 | Benayon et al. .............. 707/100 |

\* cited by examiner

*Primary Examiner* — Doug Hutton, Jr.
*Assistant Examiner* — Andrew Dyer
(74) *Attorney, Agent, or Firm* — Schwegman, Lundberg & Woessner, P.A.

(57) ABSTRACT

A method includes using rules included in two or more preflight profiles to apply to a document. The preflight profiles may be selected to reduce possibilities of conflicts. The preflight profiles may be selected based on global settings or local settings. The preflight profiles may also be selected based on priority. When there are conflicts, conflict resolution techniques may be applied.

23 Claims, 10 Drawing Sheets

| Category 605 | Rules 610 |
|---|---|
| Client | Allowed spot colors<br>Document size |
| Campaign | Allowed fonts<br>Spelling settings |
| Printer | Image resolution<br>Minimum type size |

*FIG. 6A*

| | | |
|---|---|---|
| Client | Client X | ▼ 655 |
| Campaign | Campaign 1234B | ▼ 660 |
| Printer | Printer B | ▼ 665 |

*FIG. 6B*

METHODS AND SYSTEMS FOR PREFLIGHTING USING MULTIPLE PREFLIGHT PROFILES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, ADOBE SYSTEMS INCORPORATED. All Rights Reserved.

TECHNICAL FIELD

The present application relates generally to the technical field of document processing. For example, an embodiment of the invention relates to verifying documents using multiple profiles.

BACKGROUND

In general, preflight is a process that enables users to check a document for errors. The preflight is applied so that errors can be corrected before the document is sent to a printer. For example, the document may be an electronic version of a magazine, and errors in the document can prove to be expensive when the magazine has to be reprinted to remove the errors. An example of preflight features may be found in ADOBE® ACROBAT of Adobe Systems of San Jose, Calif.

A preflight rule is a small bit of intelligence (and parameters) that looks for a particular kind of problem in a document. For example a rule may look for text that is too small. Such a rule might have two parameters which include whether to check the text and if the text is to be checked, whether the text is too small. The first parameter is the on/off state of the rule. The second parameter is a threshold value to determine whether the text is too small. For example, the threshold may be four (4) points or 0.055 inches in height. A preflight profile may simply be a collection of preflight rules. Each preflight profile may be associated with a preflight name. For example, there may be a preflight profile called "Magazine" which includes preflight rules that may be used to check for errors in a document that will be used as part of a magazine publication. The preflight rules in the "Magazine" preflight profile may restrict the document from having any spot colors and from having any text smaller than 6 points in size, and so on.

Typically, the preflight is applied to a document using only one preflight profile at a time. This arrangement may not be ideal and may be very time consuming.

BRIEF DESCRIPTION OF DRAWINGS

Some embodiments are illustrated by way of example and not limitation in the figures of the accompanying drawings in which:

FIG. 6A is a diagram that illustrates grouping rules into categories, in accordance with some example embodiments.

FIG. 6B illustrates an example interface that may be used to select a preflight profile that may be designed to include rules that do not conflict with one another, in accordance with some example embodiments.

DETAILED DESCRIPTION

For some example embodiments, methods and systems to apply a preflight to a document may employ multiple preflight profiles. In the following description, for purposes of explanation, numerous specific details are set forth in order to provide a thorough understanding of some example embodiments. It will be evident, however, to one skilled in the art that the present invention may be practiced without these specific details.

Overview

A preflight is usually initiated by a user. First, the user selects a target document and a preflight profile. There may be a set of preflight profiles for a user to select from. Once a preflight profile is selected, the preflight may traverse the content of the document, applying the preflight rules and generating a report of errors as they are encountered. For example, the preflight may check the document for errors associated with fonts, colors, and alignment. The user is presented with the results which can be saved as a report. Those results become a starting point of a separate process of correction.

For some example embodiments, the preflight may be improved by combining multiple preflight profiles together. The preflight profiles may be selected such that there is no conflict among the preflight rules (also referred to as rules) in the preflight profiles. Other embodiments may also be described to enable multiple preflight profiles to be combined or used together to make the preflight more efficient. The preflight may be applied to any printing and/or publication processes that may enable the users to save time and expenses associated with correcting errors due to conflicts, collisions, and/or errors. The preflight techniques described herein may be implemented in software, hardware, or a combination of both.

Multiple Preflight Profiles

Figure 1:
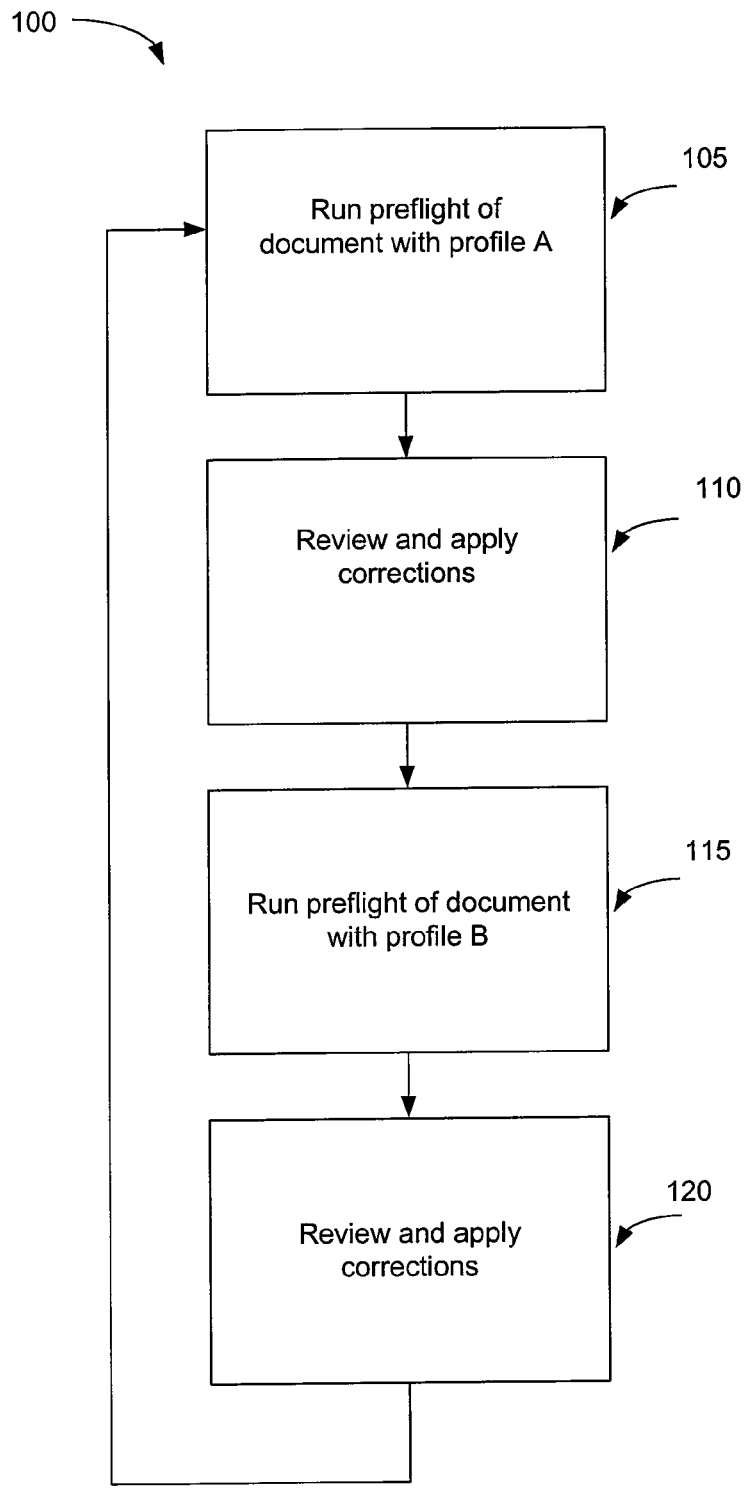
FIG. 1 illustrates an example of a preflight, in accordance with some example embodiments.

FIG. 1 illustrates an example of a preflight, in accordance with some example embodiments. Traditionally, to initiate a preflight 100, a user may select a first preflight profile (e.g., preflight profile A) from a set of preflight profiles. The first preflight profile may then be applied to a document, as illustrated in block 105. An error report may be generated and reviewed by the user to make necessary corrections, as illustrated in block 110. The user may then select a second preflight profile (e.g., preflight profile B) from the set of preflight profiles. The second preflight profile may then be applied to the document, as illustrated in block 115. An error report may be generated and reviewed by the user to make necessary corrections, as illustrated in block 120. The pre-flight process 100 may need to be repeated since the user may want to make sure that the corrections associated with the second preflight profile are not incompatible with the first preflight profile.

As illustrated in FIG. 1, each of the preflight profiles 105 is applied to a document at a time. When two or more preflight profiles 105 are required, they may be applied in series. This is time consuming and also not efficient because a document typically has to comply with more than one set of rules, imposed by different parties, in different combinations. For example, a promotional poster being designed for a particular advertisement campaign may need to comply with the color requirements of the marketing department (e.g., the poster must use PANTONE 7413C or a specific set of CMYK values for the logo and related artwork). The poster also need to comply with the typeface requirements of the creative director, the print production restrictions of the one or more print service providers, and so on. In addition there may be a common set of rules that a given designer always wants to impose, such as any overset text frames need to be caught, missing fonts or graphics are a problem, and so on.

All of these rules add complexity to the design of the document, especially when they come from different sources. As such, it is almost impossible to have a standard preflight profile that includes all the necessary rules. To make the situation worse, the rules may change after the document has already been started.

Combining Multiple Rules to Form Super Profiles

Figure 2:
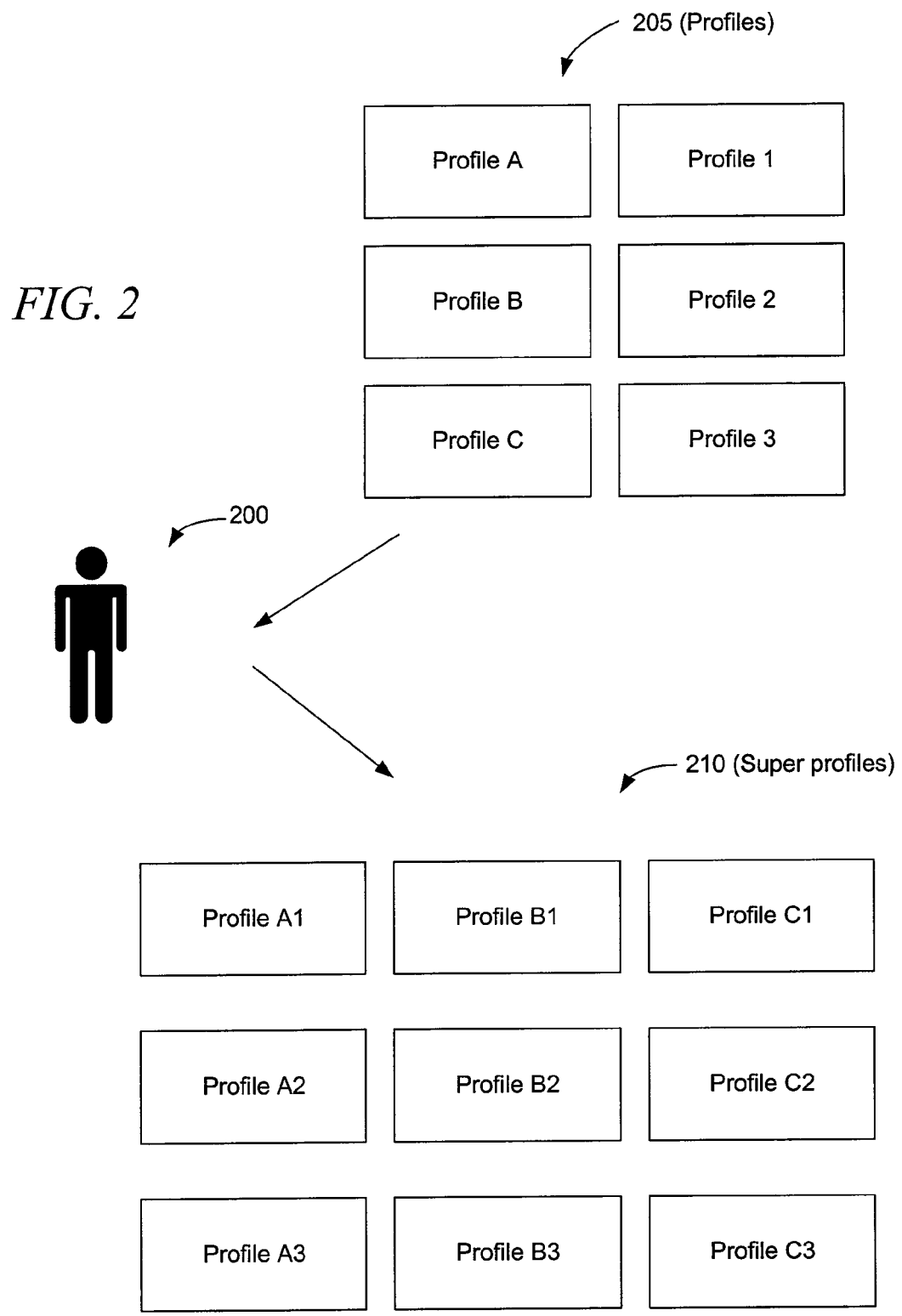
FIG. 2 is a block diagram illustrating one possible approach of combining preflight rules, in accordance with some example embodiments.

FIG. 2 is a block diagram illustrating one possible approach of combining preflight rules, in accordance with some example embodiments. To reduce the number of preflight profiles required for a preflight, user 200 may combine the rules of two or more preflight profiles from the set of preflight profiles 205 and create a more comprehensive preflight profile (also referred to as a super profile). There may be multiple super profiles 210. One or more of the super profiles 210 may then be applied to a document.

Using the super profiles 210 may be one solution to the traditional approach. However, this solution may be associated with the overhead costs of managing multiple super profiles 210 in a workflow and managing changes to the rules in the super profiles 210.

Selecting Multiple Profiles to Apply Multiple Rules

Figure 3:
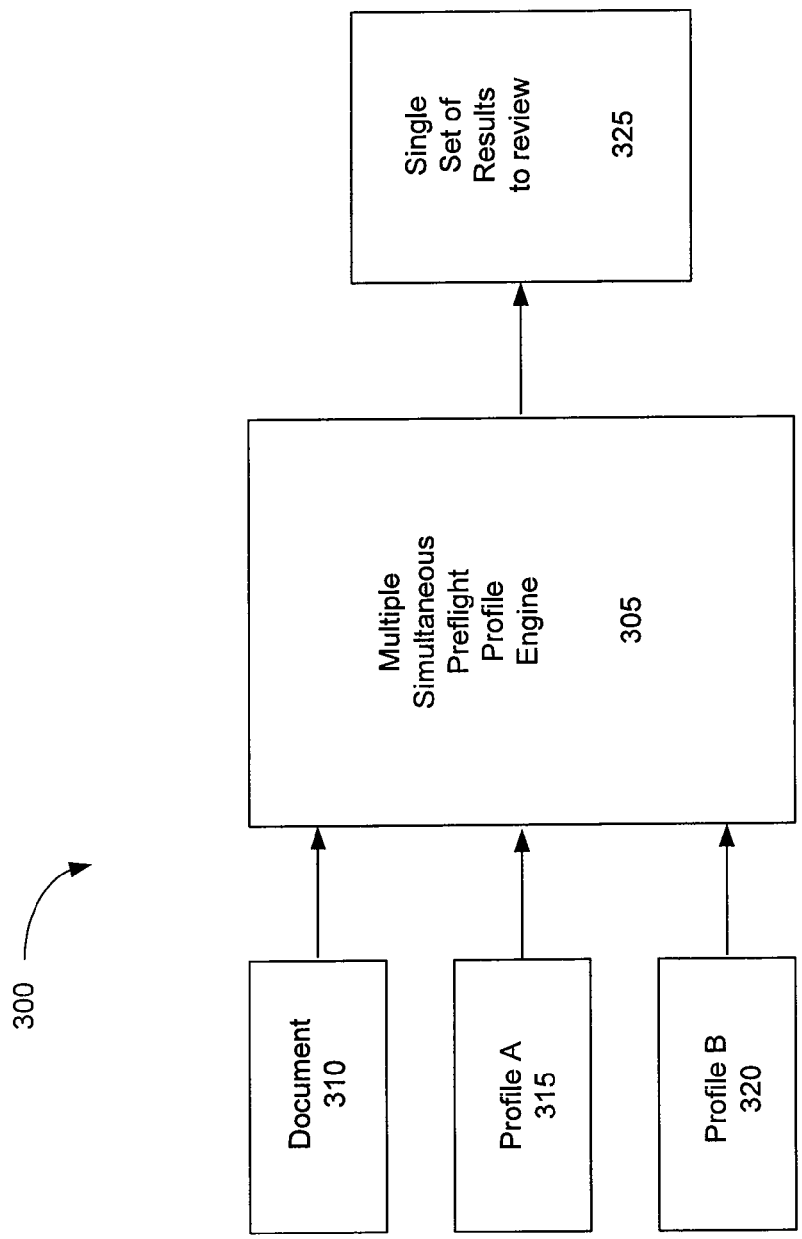
FIG. 3 is a block diagram illustrating an example of a preflight engine, in accordance with some example embodiments.

FIG. 3 is a block diagram illustrating an example of a preflight engine, in accordance with some example embodiments. Preflight engine 305 in diagram 300 may be able to apply multiple profiles to a document together. In the current example, the preflight engine 305 may apply the preflight profiles 315, 320 to document 310. The preflight engine 305 may generate a report 325 for the user to review. Different techniques may be used to identify the multiple preflight profiles to be used by the preflight engine 300. Following are some example embodiments of how the multiple preflight profiles may be selected.

A/ Ad-Hoc Preflight Profile Selection

Figure 4:
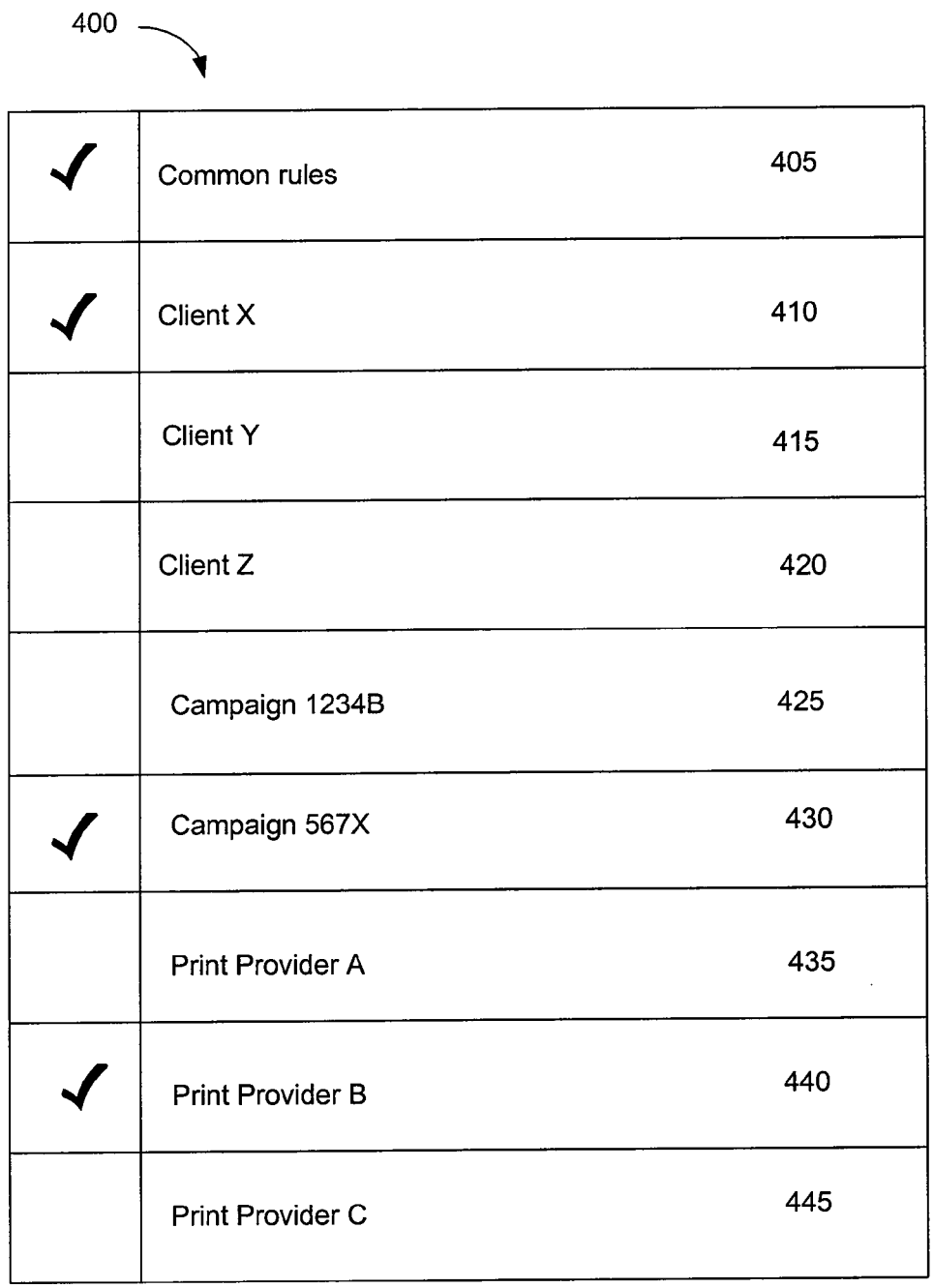
FIG. 4 illustrates an example preflight profile selection interface, in accordance with some example embodiments.

For some example embodiments, the preflight profiles may be selected from a list of preflight profiles. The selection may be performed via an interface. An example preflight profile selection interface is illustrated in FIG. 4. Interface 400 may include a list of preflight profiles 405-445. There may be a preflight profile 405 that has all the common rules, and it may always be included in a list of selected preflight profiles. In this example, each of the preflight profiles 410-445 may be associated with a client, a campaign, or a print provider. Each of the preflight profiles 405-445 may include rules that meet the requirements of the corresponding entity or object, and there may be conflicts among these rules. A user may select the preflight profiles 405, 410, 430 and 440, as illustrated in FIG. 4.

B/ Globally-Applied Preflight Profiles

For some example embodiments, selected preflight profiles may be globally associated with a workstation. A user may select one or more preflight profiles that the user always wants to apply to any documents that the user works on using that particular workstation. This global setting may be useful when the user always wants to apply the rules of certain preflight profiles (e.g., graphics related preflight profiles) regardless of the rules included in other preflight profiles (e.g., typeface related preflight profiles). The association of a workstation with one or more preflight profiles may be performed using software, hardware, or a combination of both.

C/ Embedded Preflight Profiles

Figure 5:
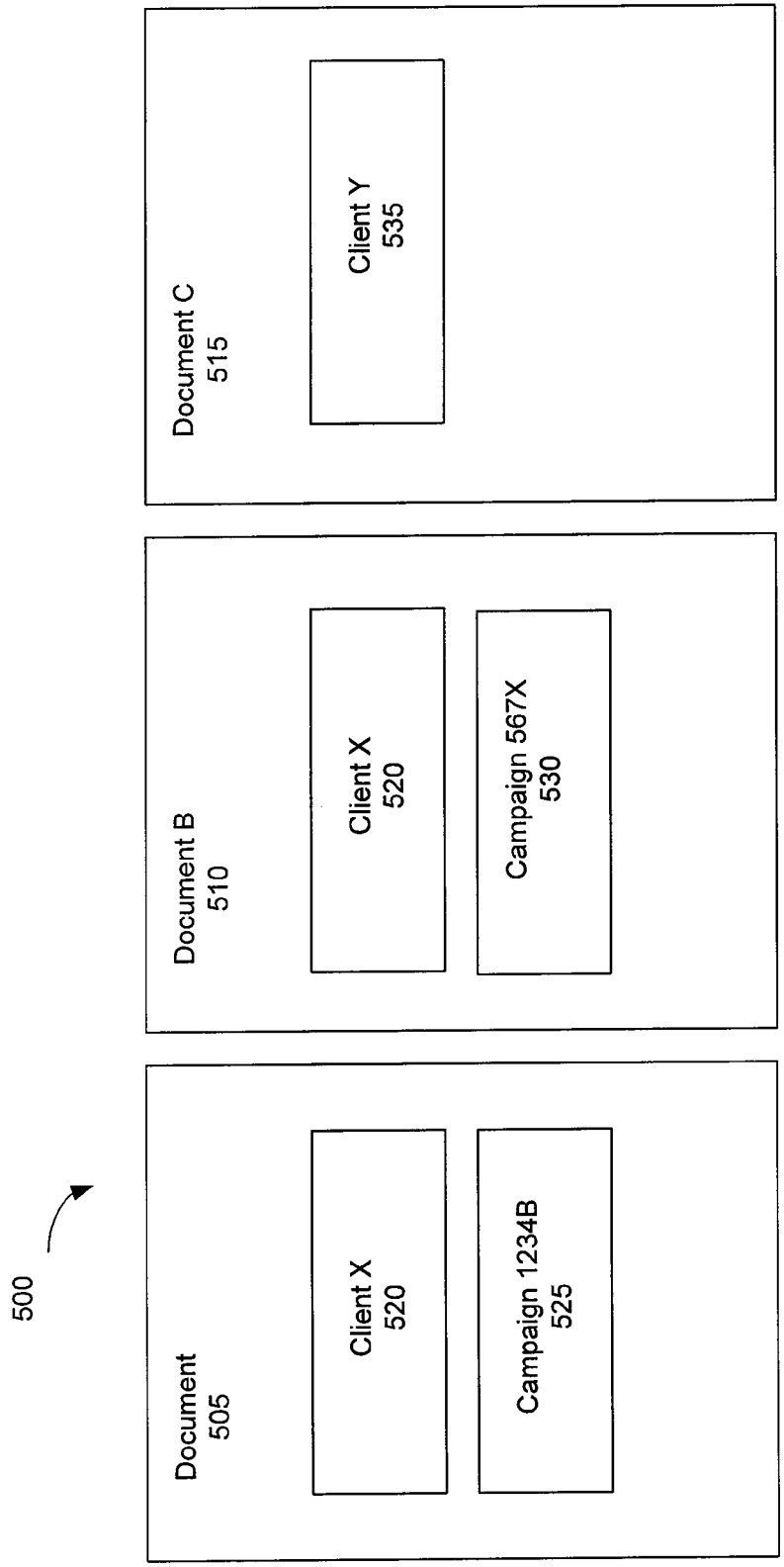
FIG. 5 illustrated an example of embedded preflight profiles, in accordance with some example embodiments.

Besides the global settings described above, there may be different local settings as described herein. FIG. 5 illustrated an example of embedded preflight profiles, in accordance with some example embodiments. For some example embodiments, selected preflight profiles or references to the selected preflight profiles may be embedded in a document. Diagram 500 includes three documents 505-515. The document 505 includes embedded preflight profiles 520, 525. The document 510 includes embedded preflight profiles 520, 530. The document 515 includes embedded preflight profile 535.

Embedding the preflight profiles into the document enables the document to be self-checking and allows the document to be associated with rules of specific preflight profiles. For example, when it is determined that a given document is to be used for client X and campaign Y, a user can embed the "Client X" and "Campaign Y" preflight profiles in the document, which are then available to whoever opens the document anywhere in the workflow.

A preflight profile may include a set of data (e.g., parameters for the rules that are referenced in that profile, a name, a description, etc.). For embedding purposes, this data may be stored as metadata in the document. The process of embedding a preflight profile may be initiated by a user via, for example, a command. The command may select a preflight profile and a document and instruct a preflight embedding mechanism or module to embed that preflight profile in that document. Alternatively, the preflight embedding mechanism or module may automatically embed a preflight profile into a document after the user specifies that the preflight profile is to be embedded in, for example, all newly created documents.

D/ Implicit Selection Using Document Metadata or Attributes

For some example embodiments, a document may include characteristics that may be used to determine the preflight profile to apply. The characteristics may be metadata which identify their roles in a workflow. The preflight engine 500 may examine the metadata to determine which preflight profiles to apply and/or to determine preflight profiles not to apply. For example, preflight engine 500 to apply the preflight profile "Client X" to any document which includes a metadata field for "Client" and an associated metadata value of "X".

For some example embodiments, when a document includes attributes or settings, the preflight engine 500 may examine these attributes or settings to determine which preflight profiles may apply. For example, the preflight engine 500 may examine print or export settings of a document and select one or more preflight profiles that correspond to those settings.

E/ Implicit Selection Using Document Settings

For some example embodiments, the preflight engine 500 may examine a document for setting information and, based on the setting information found, may associate the document with one or more preflight profiles. For example, when the document supports a proofing mode, the preflight engine 500 may associate a preflight profile with that mode, and when the mode is active, the preflight profile is applied.

For some example embodiments, two or more of the techniques described in sections A-E above may be combined to identify the preflight profiles. For example, the technique described in section A may be combined with the technique described in section C to provide more flexibility in selecting the preflight profiles.

Applying the Selected Multiple Preflight Profiles

There may be different techniques that may be used to apply the multiple preflight profiles to a document. The selection of a technique may depend on how the preflight profiles are designed. Following are some example embodiments of how the multiple preflight profiles may be applied. It may be noted that some of these embodiments may be applied together.

1/ Preflight Profiles with Non-Conflicting Rules

FIG. 6A is a diagram that illustrates grouping rules into categories, in accordance with some example embodiments. Diagram 600 includes a list of categories 605 and a list of rules 610. There may be multiple categories 605. Each category may include one or more rules 610. For some example embodiments, the rules may be grouped into categories that are mutually exclusive. That is, rules in one category do not conflict with rules in one another category. A rule in one category may or may not conflict with another rule in the same category.

As illustrated in FIG. 6A, the rules that relate to "spot colors" and "document size" are grouped into a "client" category. The rules that relate to "allowed fonts" and "spelling settings" are grouped into a "campaign" category. The rules that relate to "image resolution" and "type size" are grouped into a "printer" category. Other rules and categories may also be used.

FIG. 6B illustrates an example interface that may be used to select a preflight profile that may be designed to include rules that do not conflict with one another, in accordance with some example embodiments. Interface 650 may be an interface that is used to display the preflight profiles that may be selected. The interface 650 may include software-based mechanism (e.g., scrolling mechanism, dropdown menu, etc.) to enable a user to display the preflight profiles that may be selected. A first preflight profile "Client X" 655 may include rules that relate to "spot colors". A second preflight profile "Campaign 1234B" 660 may include rules that relate to "allowed fonts". A third preflight profile "Printer B" 665 may include rules that relate to "image resolution", and so on.

For some example embodiments, a user may select the preflight profile "Client X" 655, the preflight profile "Campaign 1234B" 660, and the preflight profile "Printer B" 665 and provide them to the preflight engine 305 (illustrated in FIG. 3). These three preflight profiles may be applied together because they are associated with rules that belong to different categories.

2/ Post Preflight Conflict Resolution

Multiple preflight profiles may be selected and applied to a document using the selection techniques described above. For example, the preflight profiles may be selected because they are embedded in a document and also based on the metadata included in the document. As another example, the preflight profiles may be selected based on document settings and based on global settings of a workstation that a user is using. It is anticipated that, because the preflight profiles are selected using these selection techniques, the potential of having conflicting rules may be low.

The preflight engine 305 may use the preflight profiles together and may combine the errors in a common report. It may be then up to the user to review the report to perform conflict resolution. It may be possible that the user may have to apply the preflight profiles to the document again after making the corrections. For example, a first preflight profile may require at least one spot color, and a second preflight profile may not allow any spot colors. Correcting the errors to satisfy the first preflight profile may cause errors with the second preflight profile. However, this may be an acceptable solution because conflicts may be unusual. Also, since the errors are reported along with the preflight profile that triggered them, the user can determine how to proceed.

3/ Dynamic Conflict Resolution

Figure 7:
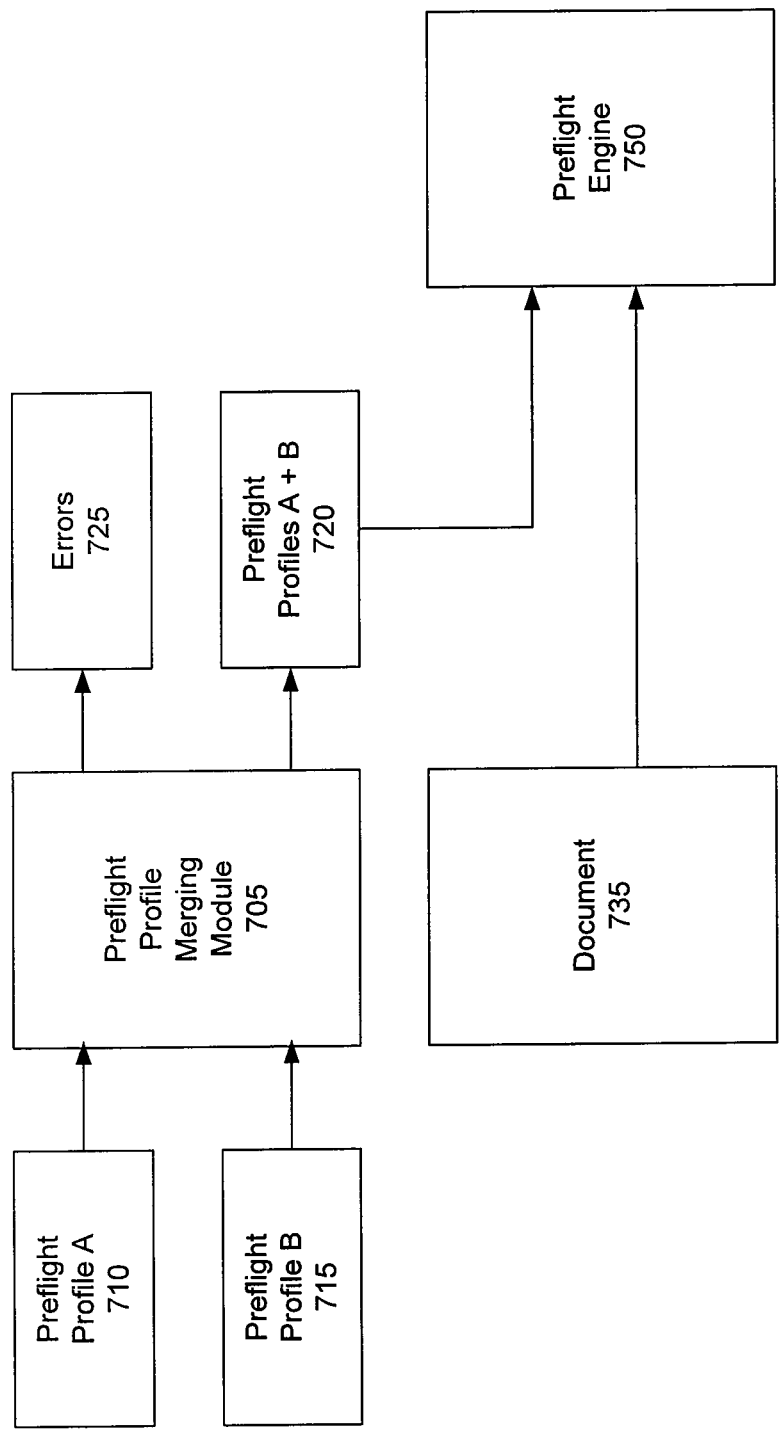
FIG. 7 is a block diagram that illustrates merging the preflight profiles, in accordance with some example embodiments.

FIG. 7 is a block diagram that illustrates merging the preflight profiles, in accordance with some example embodiments. Diagram 700 includes a preflight merging module 705 which examines the preflight profiles 710, 715 and determines the conflicts or errors. An error report 725 may be generated by the preflight merging module 705.

For some example embodiments, the preflight merging module 705 may merge the rules of the preflight profiles to form a super profile 720. The preflight merging module 705 may examine a rule to determine whether to enable it in the super profile 720. If only one preflight profile enables the rule, then that rule is enabled in the super profile 720. For example, this may be performed by copying the settings of the rule. However, if more than one preflight profile enables the rule, the preflight merging module 705 may compare their settings and determine the intersections of the settings. For example, when two of the preflight profiles have rules that include settings relating to text sizes, then the intersection of the settings include the text size. The preflight merging module 705 may change the settings, or it may report the intersection information as conflicts.

Figure 8:
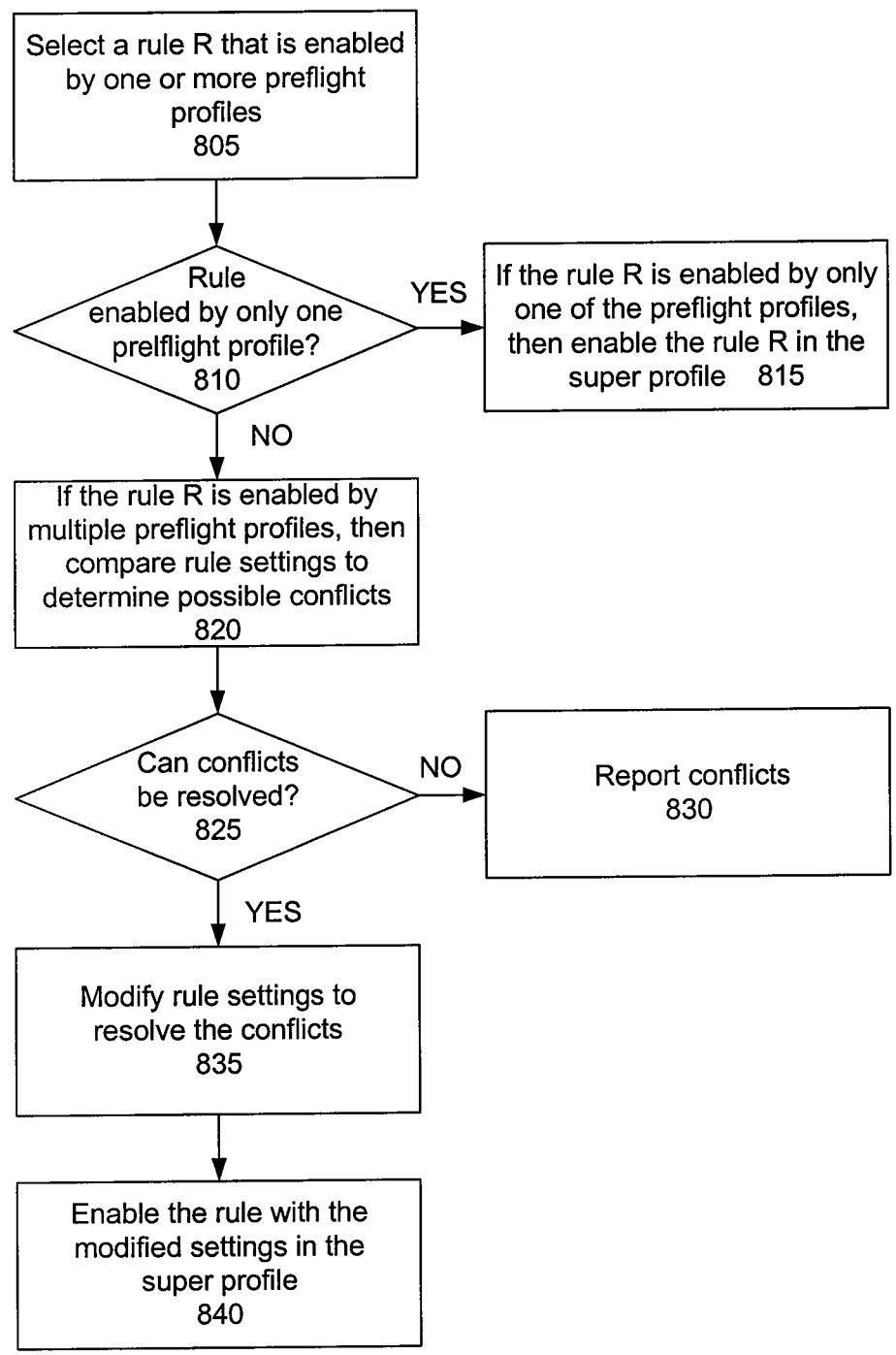
FIG. 8 is a block diagram that illustrates a process that may be performed by the preflight merging module 705 when comparing the settings of the multiple preflight profiles, in accordance with some example embodiments.

FIG. 8 is a block diagram that illustrates a process that may be performed by the preflight merging module 705 when comparing the settings of the multiple preflight profiles, in accordance with some example embodiments. The process may start at block 805 where a rule "R" that is enabled by one or more of the preflight profiles is selected.

At block 810, a test is performed to determine if the rule "R" is enabled by only one preflight profile rather than by multiple preflight profiles. If it is enabled by only one preflight profile, then the rule "R" may not have any conflicts with any other rules. In that case, the rule "R" is enabled in the super profile 720, as illustrated in block 815. However, if the rule "R" is enabled by multiple preflight profiles, then the settings of the rule "R" as used in each of these preflight profiles may need to be examined to determine if conflicts exist, as illustrated in block 820.

From block 820, when there are conflicts among the settings of the rule "R", the settings are examined to determine if the conflicts can be resolved, as illustrated in block 825. If the conflicts in the settings cannot be resolved, the conflicts are reported, as illustrated in block 830. If the conflicts in the settings can be resolved, the settings may be modified, as illustrated in block 835. At block 840, the modified settings are then applied to the rule "R" which is enabled in the super profile 720.

Figure 9:
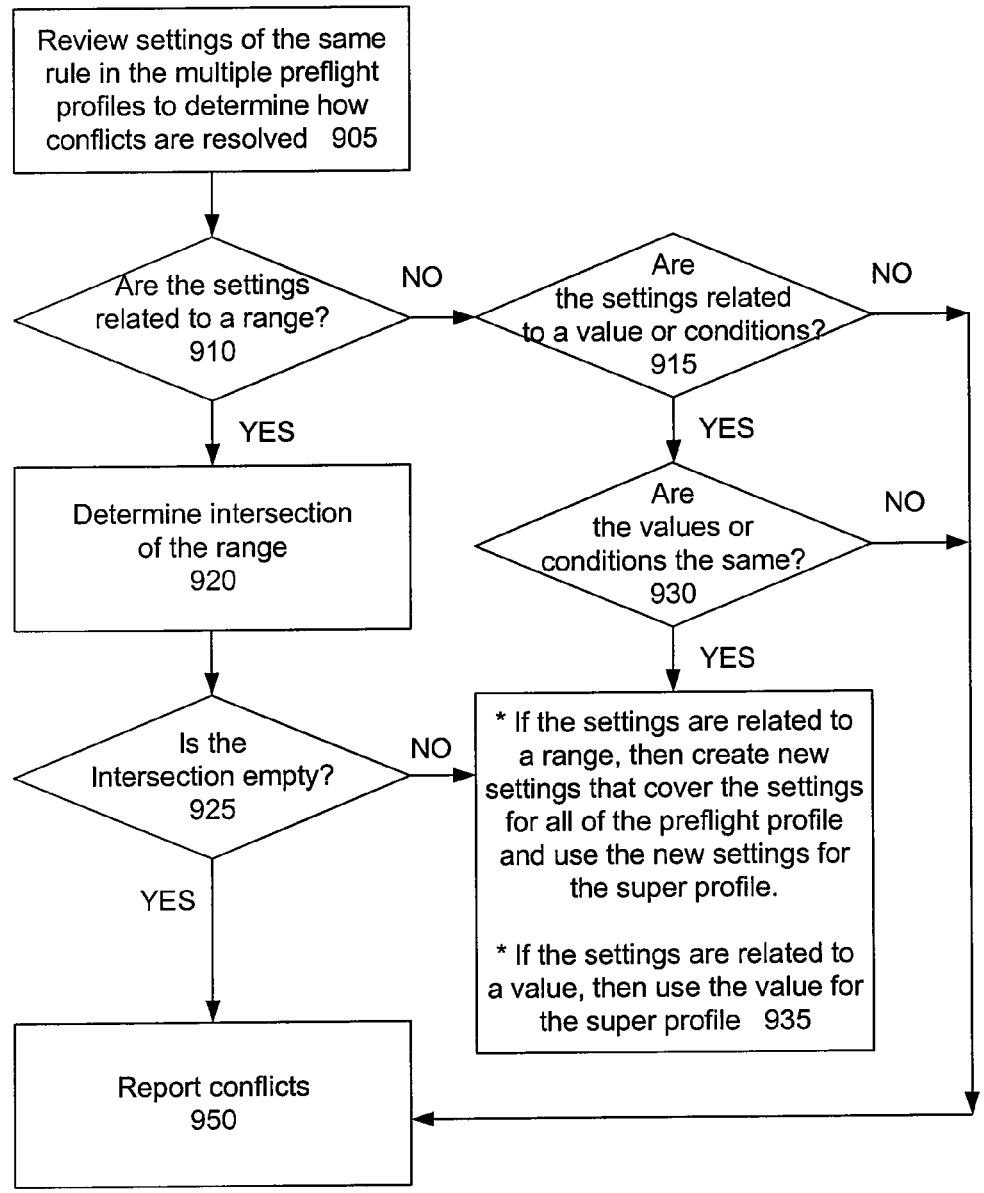
FIG. 9 is a block diagram that illustrates an example process that may be used to examine the settings to determine if conflicts exist, in accordance with some example embodiments.

FIG. 9 is a block diagram that illustrates an example process that may be used to examine the settings to determine if conflicts exist, in accordance with some example embodiments. This process expands the operation described in blocks 820 and 825. The process may start at block 905 where the settings are reviewed to determine the conflicts. At block 910, a test is performed to determine if the setting is related to a range (e.g., the text size needs to be between X and Y). If it is, the process may flow to block 920 where the intersection of the range is determined. The intersection may include an area within the range where the settings may overlap. In other words, the intersection may include a section of the range that may satisfy all of the settings of each of the preflight profiles.

At block 925, a test is performed to determine if the intersection is empty. When an intersection is empty, it may mean that the settings do not generally fall into a common area of the range. If the intersection is empty, the process may flow to block 950 where conflicts are reported. If the intersection is not empty, the process may flow from block 925 to block 935 where the settings may be modified and used for the super profile 720. For example, when a rule is related to text size and the setting of the rule for a first preflight profile is "larger than 6 points" and the setting of the same rule for a second preflight profile is "between 2 and 20 points", then the resulting settings can be "between 6 and 20 points." However, if one setting is "larger than 10 points" and another setting is "less than 8 points", then the intersection is empty.

Going back to block 910, if the settings are not related to a range, the process may flow to block 915, wherein it is determined whether the settings are related to a value or a condition. If they are not, the process may flow to block 950 where the conflicts are reported.

From block 915, if the settings are related to a value or a condition, the process may flow to block 930, where it is determined if the values or conditions from the multiple preflight profiles are the same. If they are not the same, the conflicts are reported in block 950. If they are the same, the process may flow to block 935 where the values or conditions are used for the super profile 720. For example, if the rules of the first preflight profile and the second preflight profile have settings that require spot color names to end with the letter "C", then that same rule and setting value of "C" is used in the super profile 720. However, if one of the settings requires a spot color name to end with the letter "X", then neither setting can be used in the super profile 720 since their values "C" and "X" are not the same.

4/ Priority of Preflight Profiles

For some example embodiments, the determination of the priority of the preflight profiles may be performed automatically based on information available to the preflight merging module 705. The information may include embedded preflight profiles, globally-applied preflight profiles, metadata and attributes in the documents, etc. Some of these preflight profiles may be given higher priority than other preflight profiles. For example, the embedded preflight profiles may take precedence over the external preflight profiles and the implicit preflight profiles, etc. Using the spot color example above, if one setting requires a spot color name to end with the letter "X", and the other setting requires a spot color name to end with the letter "C", then the letter "X" requirement may prevail if that setting is associated with a preflight profile that has a higher priority.

5/ Disabling Conflicting Rules

For some example embodiments, the preflight profiles may be combined. When there are rules in the preflight profiles that conflict, those rules may be disabled. The rules that are disabled are then included in the conflicts report. This technique may defer the conflict resolution and allows the preflight merging module 705 to proceed with the non-conflicting rules. The conflicts report may state that the preflight profiles cannot be fully combined because some of the rule parameters or settings are not compatible. A user may review the conflicts report, resolve the conflicts, and rerun the preflight.

Modules, Components and Logic

Certain embodiments are described herein as including logic or a number of components, modules, or mechanisms. A component may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "component" that operates to perform certain operations as described herein.

In various embodiments, a "component" may be implemented mechanically or electronically. For example, a component may comprise dedicated circuitry or logic that is permanently configured (e.g., within a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, a one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The term "module", as used herein, should be understood to refer more broadly to a tangible component or a software component, or any combination thereof. Accordingly, a module may be implemented in electronic circuitry, hardware, firmware, software or a combination thereof.

Electronic, Apparatus and System

Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 10:
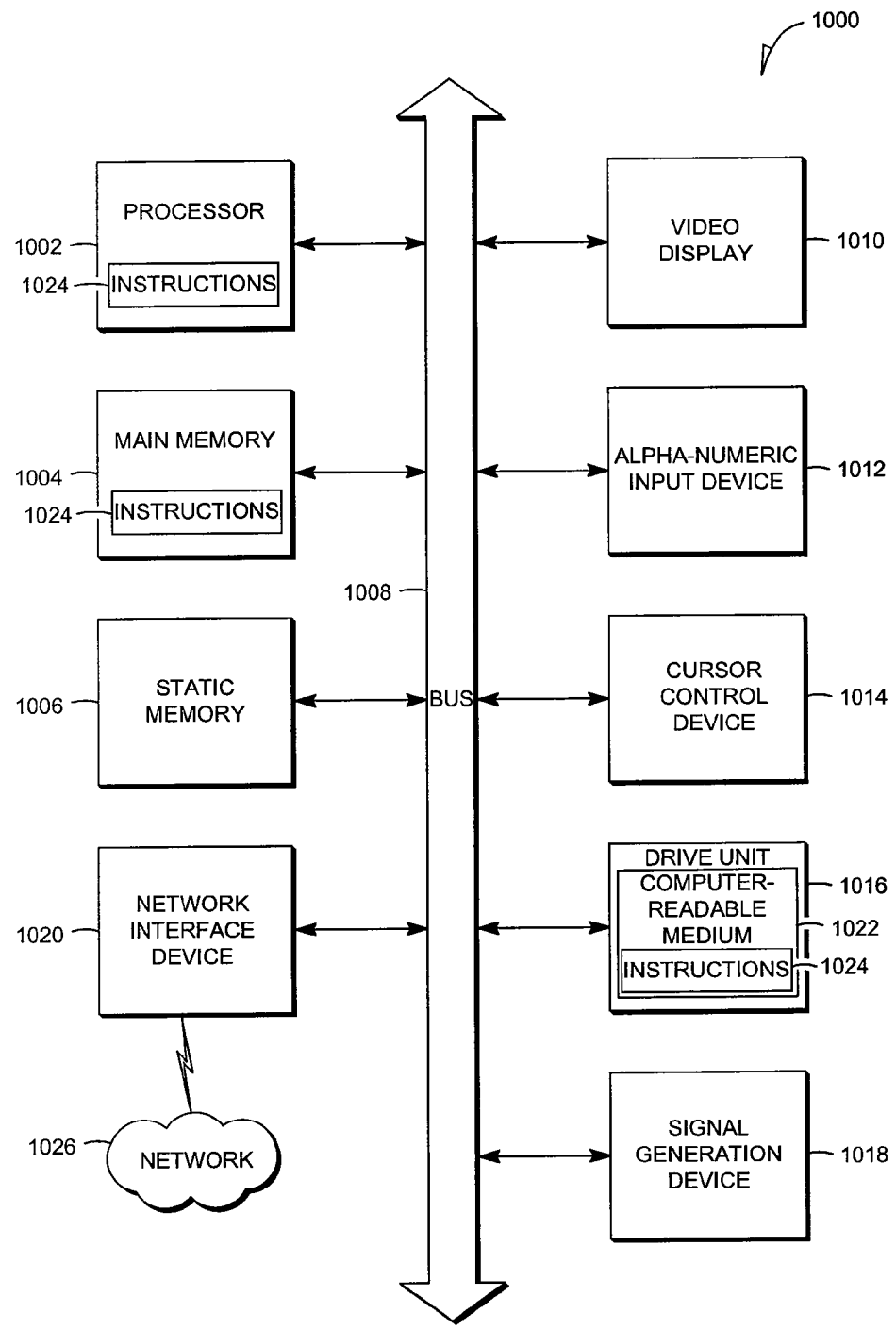
FIG. 10 is a block diagram of machine in the example form of a computer system within which instructions, for causing the machine to perform any one or more of the methodologies discussed herein, may be executed, in accordance with some example embodiments.

FIG. 10 is a block diagram of machine in the example form of a computer system within which instructions, for causing the machine to perform any one or more of the methodologies discussed herein, may be executed, in accordance with some example embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 1024 may further be transmitted or received over a communications network 1026 using a transmission medium via the network interface device 1020 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks) The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   enabling a user to select two or more preflight profiles;
   identifying a conflicted rule that is enabled by multiple preflight profiles of the two or more preflight profiles, the conflicted rule including a setting specific to each of the multiple preflight profiles, each setting including a range, the ranges not being identical;
   determining an intersection of the ranges;
   creating an amended rule based on the conflicted rule and the intersection of the ranges;
   performing, using a processor of a machine, a preflight on a document, the preflight including the amended rule.

2. The method of claim 1, further comprising:
   based on the multiple preflight profiles, generating conflict information; and
   enabling the user to view the conflict information.

3. The method of claim 2, wherein said enabling the user to view the conflict information comprises generating a conflict report.

4. The method of claim 1, wherein the two or more preflight profiles are selected from preflight profile categories that are mutually exclusive.

5. The method of claim 1, wherein at least one of the two or more preflight profiles is selected based on characteristics of the document.

6. The method of claim 5, wherein the characteristics of the document includes one or more of attributes and metadata included in the document.

7. The method of claim 1, wherein at least one of the two or more preflight profiles is selected based on global settings.

8. The method of claim 1, wherein at least one of the two or more preflight profiles is selected based on document settings.

9. The method of claim 1, further comprising:
   determining a priority of each of the two or more preflight profiles;
   identifying a second conflicted rule that is enabled by multiple preflight profiles of the two or more preflight profiles, the conflicted rule including a setting specific to each of the multiple preflight profiles; and
   enabling the second conflicted rule based on the setting of the second conflicted rule specific to a preflight profile having higher priority.

10. The method of claim 1, further comprising:
    identifying a second conflicted rule that is enabled by multiple preflight profiles of the two or more preflight profiles, the conflicted rule including a setting specific to each of the multiple preflight profiles; and
    disabling the second conflicted rule.

11. The method of claim 1, wherein said performing the preflight on the document further comprises:
    forming a super profile, wherein the super profile includes at least one rule from each of the two or more preflight profiles; and
    using the super profile to perform the preflight.

12. The method of claim 11, wherein the super profile includes a first rule that is in only one of the two or more preflight profiles.

13. The method of claim 11, wherein the super profile includes a rule of the at least one rule that is in the two or more preflight profiles, wherein the rule is associated with a range.

14. The method of claim 11, wherein the super profile includes a rule of the at least one rule that is in the two or more preflight profiles, wherein the rule is associated with a value, and wherein the same value is used in the two or more preflight profiles.

15. A system, comprising:
    a processor;
    a memory coupled to the processor;
    a preflight engine coupled to the processor; and
    a merging module coupled to the preflight engine and configured to:
       form a super profile using rules selected from two or more user-selected preflight profiles,
       identify a conflicted rule that is enabled by multiple preflight profiles of the two or more preflight profiles, the rule including a setting specific to each of the multiple preflight profiles, each setting including a range, the ranges not being identical;
    determine an intersection of the ranges;
    create an amended rule based on the conflicted rule and the intersection of the ranges;
    add the amended rule to the super profile;
the preflight engine further configured to use rules of the super profile to preflight a document.

16. The system of claim 15, wherein the rules selected from the two or more preflight profiles include at least one rule that is in only one of the two or more preflight profiles.

17. The system of claim 15, wherein the rules selected from the two or more preflight profiles includes rules that relate to a value, and wherein a value associated with a rule of a third preflight profile is the same as a value associated with a rule of a fourth preflight profile.

18. The system of claim 15, wherein a priority scheme is used to select the rules to be included in the super profile.

19. The system of claim 15, wherein the preflight profiles from which the rules are selected are embedded preflight profiles.

20. The system of claim 15, wherein the preflight profiles from which the rules are selected are determined based on one or more of global settings of a workstation and local settings in the document.

21. A non-transitory machine-readable medium having instructions that, when executed by one or more processors of a machine, cause the machine to perform operations including:

forming a combined set of rules using rules associated with a first preflight profile selected by a user and rules associated with a second preflight profile selected by the user;

identifying a conflicted rule that is enabled by both the first preflight profile and the second preflight profile, the conflicted rule including a setting specific to each of the first and second preflight profiles, each setting including a range, the ranges not being identical;

determining an intersection of the ranges;

creating an amended rule based on the conflicted rule and the section of the ranges;

forming a super profile based on non-conflicting rules in the combined set of rules and the amended rule; and performing preflight on a document using the super profile.

22. The non-transitory machine-readable medium of claim 21, wherein the first preflight profile and the second preflight profile are selected based on one or more of embedded preflight profiles, global settings, and local settings.

23. The non-transitory machine-readable medium of claim 21, wherein the first preflight profile and the second preflight profile are selected based on their rules being mutually exclusive.

* * * * *